(12) United States Patent
Phatak et al.

(10) Patent No.: US 11,933,211 B2
(45) Date of Patent: Mar. 19, 2024

(54) PROGNOSTIC ALERT STRATEGY FOR REDUCTANT PUMP IN EXHAUST AFTERTREATMENT SYSTEM FOR ENGINE

(71) Applicant: Caterpillar Inc., Peoria, IL (US)

(72) Inventors: Deepashri Phatak, Peoria, IL (US); Dereck G Heffron, Peoria, IL (US); Jun Cai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 174 days.

(21) Appl. No.: 17/552,636

(22) Filed: Dec. 16, 2021

(65) Prior Publication Data
US 2023/0193802 A1 Jun. 22, 2023

(51) Int. Cl.
F01N 3/20 (2006.01)
F04B 49/06 (2006.01)
F04B 51/00 (2006.01)
G05B 23/02 (2006.01)

(52) U.S. Cl.
CPC ........ *F01N 3/2066* (2013.01); *F01N 2550/05* (2013.01); *F01N 2590/08* (2013.01); *F01N 2610/1433* (2013.01); *F01N 2900/1808* (2013.01); *F01N 2900/1822* (2013.01); *F04B 49/065* (2013.01); *F04B 51/00* (2013.01); *F04B 2205/05* (2013.01); *G05B 23/0221* (2013.01)

(58) Field of Classification Search
CPC ............... F01N 3/2066; F01N 2550/05; F01N 2590/08; F01N 2610/1433; F01N 2900/1808; F01N 2900/1822; F01N 2560/08; F01N 11/002; F01N 3/208; F01N 2610/02; F01N 2610/144; F01N 2900/1812; F01N 2900/1821; F04B 49/065; F04B 51/00; F04B 2205/05; G05B 23/0221; Y02T 10/12; Y02T 10/40
See application file for complete search history.

(56) References Cited

U.S. PATENT DOCUMENTS

| | | | |
|---|---|---|---|
| 8,806,853 B2 | 8/2014 | Johnson et al. | |
| 9,297,286 B2 | 3/2016 | Kruer et al. | |
| 9,689,291 B2 | 6/2017 | Zhang et al. | |
| 2009/0241516 A1* | 10/2009 | Leprieur | F01N 3/0253 60/286 |
| 2014/0260216 A1* | 9/2014 | Everard | F01N 3/208 73/114.75 |
| 2014/0331645 A1 | 11/2014 | Cole et al. | |
| 2015/0218990 A1* | 8/2015 | Hudgens | F01N 3/2066 422/111 |
| 2018/0163605 A1* | 6/2018 | Gharpure | F01N 3/2896 |
| 2020/0109655 A1* | 4/2020 | Lawand | F01N 11/00 |

* cited by examiner

*Primary Examiner* — Brandon D Lee
(74) *Attorney, Agent, or Firm* — Brannon Sowers & Cracraft PC

(57) ABSTRACT

Operating an engine exhaust aftertreatment system includes receiving fluid pressure data of a reductant pump, determining a pump operating state, and comparing a pump health parameter to a prognostic pump failure criterion based upon the determining a pump operating state. Operating an engine exhaust aftertreatment system further includes outputting a pump health alert based upon a difference between the pump health parameter and the prognostic pump failure criterion. Related control logic is also disclosed.

20 Claims, 2 Drawing Sheets

PROGNOSTIC ALERT STRATEGY FOR REDUCTANT PUMP IN EXHAUST AFTERTREATMENT SYSTEM FOR ENGINE

TECHNICAL FIELD

The present disclosure relates generally to monitoring pump operation in an exhaust aftertreatment system for an engine, and more particularly to prognostically detecting pump performance degradation or failure.

BACKGROUND

Exhaust aftertreatment systems are well known from the internal combustion engine field. Engine operation combusts a mixture of fuel of air to produce a rapid pressure and temperature rise in combustion cylinders in an engine, generating emissions of carbon dioxide, carbon monoxide, oxides of nitrogen and various organic and inorganic species. The exhaust aftertreatment system employs various mechanisms for reducing certain of these emissions to prevent discharging them to the atmosphere. One known exhaust aftertreatment device used to reduce oxides of nitrogen or "NOx" is known as a selective catalytic reduction device or "SCR". SCR devices have been employed successfully throughout the world for many years.

In order to operate an SCR device a reductant is required to be injected into the stream of exhaust from the engine. Such reductants are generally referred to as diesel emissions fluid or DEF and are typically carried in fluid tanks on-board an engine or associated machine. Components in an exhaust aftertreatment system relating to injection of DEF generally include one or more pumps and one or more injectors that fluidly connect to an exhaust conduit in the exhaust system. In order to achieve sufficient atomization of the injected DEF injection pressures are typically at least several thousand pounds per square inch. The DEF itself tends to be a relatively corrosive fluid. Coupled with the relatively high injection pressures the operating environment of such systems and demands on components tend to be quite harsh. Failure or performance degradation of DEF pumps, injectors, or other equipment can result in unplanned and expensive machine downtime for servicing or repair. United States Patent Application Publication No. US20140331645A1 is directed to a system and method for injector fault remediation, and discloses a typical example of one of these systems. The art provides ample room for improvements and development of alternative strategies.

SUMMARY

In one aspect, a method of operating an exhaust aftertreatment system for an engine includes receiving fluid pressure data of a reductant pump in an exhaust aftertreatment system for an engine, and determining one of a first pump operating state or a second pump operating state of the reductant pump. The method further includes comparing a pump health parameter indicated by the fluid pressure data to one of a first prognostic pump failure criterion or a second prognostic pump failure criterion based upon the determining one of a first pump operating state or a second pump operating state of the reductant pump. The method further includes outputting a pump health alert based upon a difference between the pump health parameter and the respective one of the first prognostic pump failure criterion or the second prognostic pump failure criterion.

In another aspect, an exhaust aftertreatment system includes a reductant pump, a fluid pressure sensor, and a reductant pump control unit. The reductant pump control unit is structured to receive fluid pressure data of the reductant pump from the fluid pressure sensor, and to determine one of a first pump operating state or a second pump operating state of the reductant pump. The reductant pump control unit is further structured to compare a pump health parameter indicated by the fluid pressure data to one of a first prognostic pump failure criterion or a second prognostic pump failure criterion based upon the determined one of a first pump operating state or a second pump operating state of the reductant pump. The reductant pump control unit is further structured to output a pump health alert based upon a difference between the pump health parameter and the respective one of the first prognostic pump failure criterion and the second prognostic pump failure criterion.

In still another aspect, a control system for an exhaust aftertreatment system in a machine includes a reductant pump control unit. The reductant pump control unit is structured to receive fluid pressure data of a reductant pump indicative of a pump health parameter, and to determine a reductant pump operating state. The reductant pump control unit is further structured to compare the pump health parameter to a prognostic pump failure criterion that is dependent upon the determined reductant pump operating state, and to output a pump health alert based upon a difference between the pump health parameter and the prognostic pump failure criterion.

DETAILED DESCRIPTION

Figure 1:
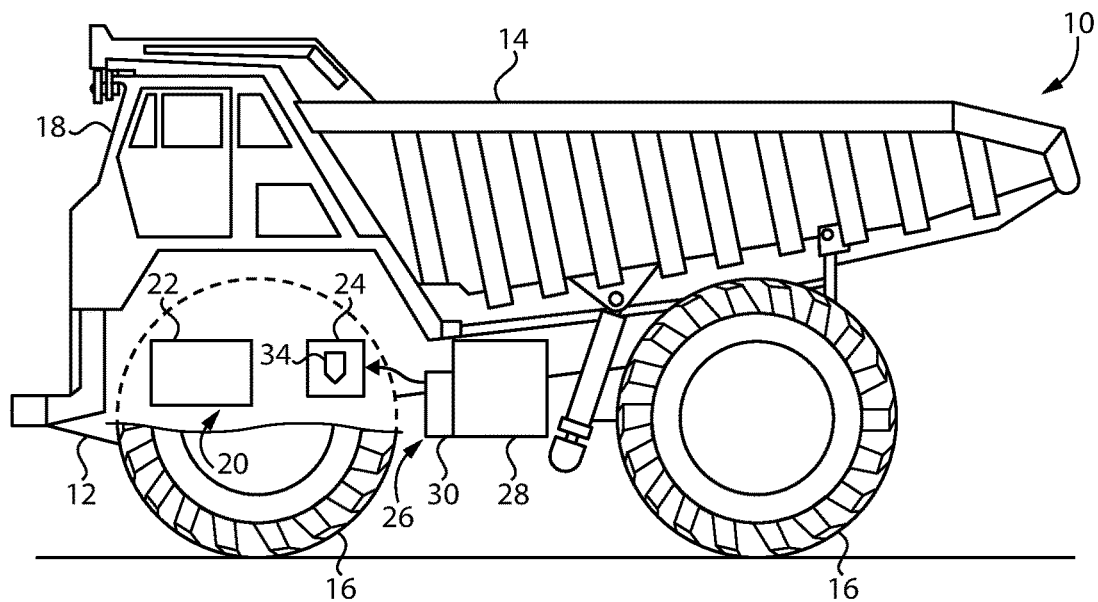
FIG. 1 is a side diagrammatic view of a machine, according to one embodiment.

Referring to FIG. 1, there is shown a machine 10 according to one embodiment. Machine 10 includes a frame 12, supported on ground engaging wheels 16. Machine 10 is show in the context of a mining truck having a dump bed 14 and a cab 18. In other embodiments, machine 10 could be a different off-highway machine such as a track-type tractor, an excavator, a loader, or a variety of other off-highway or on-highway machines. Machine 10 could also be a stationary machine such as a generator set, a pump, a compressor, or still another. It will be appreciated that machinery implementations of the present disclosure are essentially unlimited, and the illustration of a mining truck is but one of many possible example applications.

Machine 10 further includes an internal combustion engine system 20 having an engine 22. Engine 22 may be a direct-injected compression/ignition engine operated on a suitable compression-ignition liquid fuel, such as a diesel distillate fuel. Engine 22 could be operated to mechanically drive ground engaging wheels 16 or to operate an electric generator that powers electric drive motors, for example. Engine system 20 further includes an exhaust system 24 having an aftertreatment system 26. Aftertreatment system 26 may include a reductant tank 28 storing an on-board volume of a liquid reductant such as a commercially available diesel emissions fluid or DEF. Description and discussion herein of "DEF" should not be understood to require any particular type of reductant. Aftertreatment system 26 may also include a pump subassembly 30 mounted, for example, directly on tank 28, and including one or more reductant pumps. A feed of DEF fluid can be pumped from pump subassembly 30 to one or more DEF injectors 34. DEF injectors 34 may be electrically actuated and electronically controlled to inject DEF into a stream of exhaust from engine 22 for purposes of operating a selective catalytic reduction or SCR device as will be familiar to those skilled in the art. As will be further apparent from the following description, aftertreatment system 26 may be uniquely operated to prognostically detect expected pump failure or performance degradation.

Figure 2:
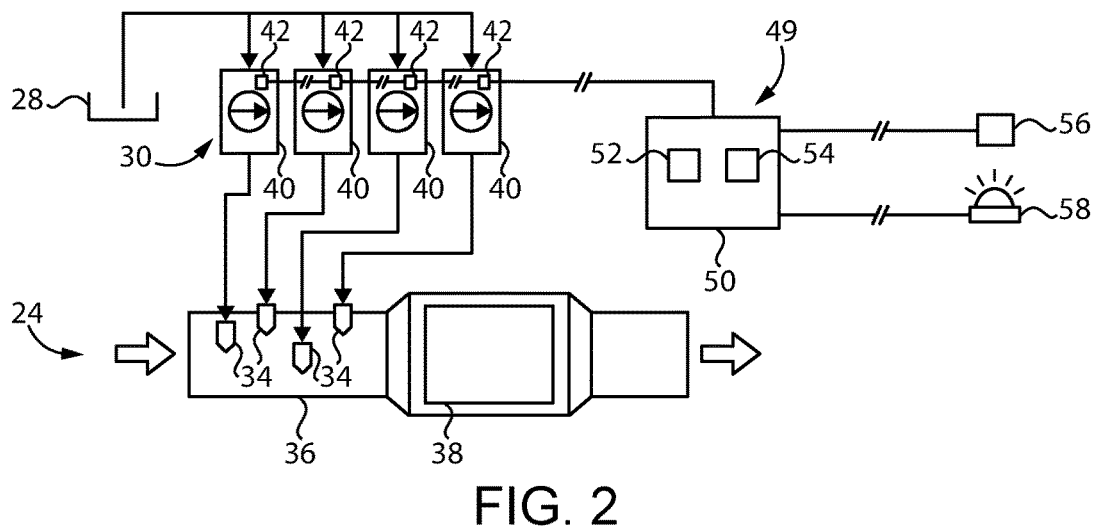
FIG. 2 is a diagrammatic view of an exhaust system, according to one embodiment.

Referring also now to FIG. 2, there are shown additional features of exhaust system 24 and aftertreatment system 26 in further detail. Exhaust system 24 includes an exhaust conduit 36 with an SCR catalyst 38 therein. SCR catalyst 38 can function to treat exhaust from engine 22 to reduce oxides of nitrogen or NOx in a generally conventional manner. Also shown in FIG. 2 are a total of four DEF pumps 40 in pump subassembly 30, and a total of four DEF injectors 34. DEF injectors 34 may be fluidly connected to exhaust conduit 36 to inject DEF at locations upstream of SCR catalyst device 38. DEF injectors 34 may be positioned at different longitudinal (upstream to downstream) locations and/or different circumferential locations around exhaust conduit 36 in some embodiments. In one implementation, each of DEF pumps 40 operates simultaneously to inject DEF into the exhaust stream at periodic intervals, or on an as-needed basis depending upon operating states of machine 10. For example, when engine 22 is operating at a rated load, DEF pumps 40 may be operated relatively more frequently, whereas if machine 10 and engine 22 are idling, DEF pumps 40 may be operated relatively less frequently or not at all, depending upon needs for reductant delivery for SCR operation that are well characterized in the art. Each time that DEF pumps 40 operate, they will typically operate in a pressure building or build-up state to increase pump outlet pressure to a desired injection pressure. When the desired injection pressure is reached, DEF injectors 34 can be operated to inject DEF into the exhaust stream. The pressure building state can be understood as a first pump operating state including a pump priming state in some embodiments. When injection pressure has been reached operation of DEF pumps 40 can be understood as a metering and control state including a dosing state in some embodiments.

As discussed above, pump failure or performance degradation can have undesired consequences in an exhaust aftertreatment system. There may be multiple failure modes possible with a first failure mode observed in relation to a first pump operating state such as a pressure building state, and a second failure mode observed in connection with a second pump operating state or metering and control state. In some instances, pump failure or performance degradation in the first pump operating state can be a slower failure mode with changes or aberrations in pump operation, such as a longer duration time-to-prime than desired, being observed. Also, in some instances the failure or performance degradation associated with the second pump operating state can be a faster failure mode. Taking too long to prime can undesirably impact performance of aftertreatment system 26 as one or more of reductant pumps 40 may not be capable of delivering DEF at a desired injection pressure at a desired timing. Failure or performance degradation in relation to a metering and control state can mean that the pump, even if primed, can fail to deliver the desired DEF injection pressure at all. As noted above, the present disclosure recognizes these different failure modes and proposes solutions enabling an expected or likely failure or performance degradation of a DEF pump to be detected prognostically such that inspection or servicing can be undertaken.

To this end, aftertreatment system 26 further includes a control system 49. Control system 49 may include a reductant pump control unit 50 or ECM. ECM 50 may include a programmable logic controller 52 and a computer readable memory 54. Programmable logic controller 52, hereinafter reductant pump control unit 52, includes any suitable processor such as a microprocessor or a microcontroller. Memory 54 includes any suitable computer readable memory such as RAM, ROM, SDRAM, EEPROM, FLASH, etc. and stores computer executable instructions which, when executed by reductant pump control unit 52, perform the functions described herein. Control system 49 also includes a plurality of fluid pressure sensors 42 each associated with, and typically resident on, one of DEF pumps 40.

In an implementation, each of fluid pressure sensors 42 produces fluid pressure data of the corresponding one of reductant pumps 40. The fluid pressure data can include pump outlet pressure. Hence, each fluid pressure sensor 42 can include a pump outlet pressure sensor. Fluid pressures could be sensed at other locations in aftertreatment system 26 consistent with the aims of the present disclosure, for example, at DEF injectors 34. Control system 49 also includes an alert device 58 such as a light, a sound device, or another alert device capable of operating to change its state, typically in a manner perceptible to a human operator or a supervisory controller, responsive to alert signals generated by ECM 50 as further discussed herein. Control system 49 also includes a machine sensor 56 which can monitor a parameter indicative of machine state of machine 10. For example, machine sensor 56 could include an engine speed sensor, a fueling sensor, an airflow sensor, or some other suitable sensor or sensor group that can indicate an operating state of engine system 20. An operating state of engine system 20 can include a not operating state, an idle operating state, a rated load operating state, or still another.

Figure 3:
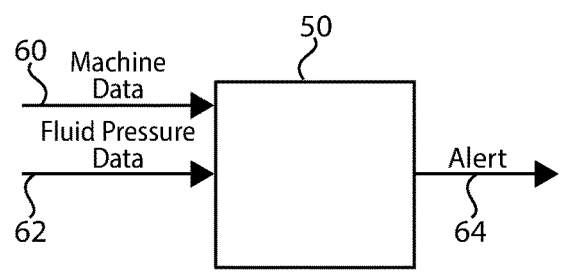
FIG. 3 is a functional block diagram of a reductant pump control unit, according to one embodiment.

Reductant pump control unit 52, referred to at times interchangeably with ECM 50, may be structured to receive fluid pressure data of each reductant pump 40 from the associated fluid pressure sensor 42. Reductant pump control unit 52 may be further structured to determine one of a first pump operating state or a second pump operating state of the one or more reductant pumps 40. Reductant pump control unit 52 is also structured to compare a pump health parameter indicated by the fluid pressure data to one of a first prognostic pump failure criterion or a second prognostic pump failure criterion based upon the determined one of a first pump operating state or a second pump operating state of the reductant pumps 40. It will be recalled the first pump operating state may be a pressure building state including a pump priming state. The second pump operating state may be a metering and control state. The metering and control state can be further understood to include a dosing of DEF state in some embodiments. The pump health parameter may include an observed pressure building time duration or a time-to-prime, and the first prognostic pump failure criterion may include an expected pressure building time duration. Thus, comparing a pump health parameter to a prognostic pump failure criterion can include comparing observed pressure building time duration to an expected pressure building time duration. The pump health parameter may also include an observed pump outlet pressure magnitude, and the second prognostic pump failure criterion may include an expected pump outlet pressure magnitude. In this way, depending upon the determined pump operating state, reductant pump control unit 52 can apply appropriate criteria to determine if pump failure or performance degradation has occurred or is expected. Reductant pump control unit may be further structured to output a pump health alert based upon a difference between the pump health parameter and the respective one of the first prognostic pump failure criterion and the second prognostic pump failure criterion. In some embodiments, the subject difference can be an arithmetic difference. In other words, reductant pump control unit 52 can calculate an arithmetic difference between an observed pressure building time duration to a target pressure and an expected time duration, or an arithmetic difference between an observed outlet pressure magnitude and an expected outlet pressure magnitude. The outputted pump health alert can be a control signal to alert device 58. It will be recalled that reductant pumps 40 may be operated simultaneously. Accordingly, if any one of the pumps appears to be operating out of specifications with regard to time-to-prime or outlet pressure an alert can be generated that signals an operator or a supervisory controller to service aftertreatment system 26. As will also be further apparent from the following description reductant pump control unit 52 may be structured to execute different logic paths based on the present pump operating state that is determined. Referring also to FIG. 3, there shown a diagram of ECM 50 showing a machine data input at 60 and a fluid pressure data input at 62. Utilizing the machine data, ECM 50 can determine present operating state(s) of machine 10 including engine system 20 and aftertreatment system 26 as discussed herein. Using the fluid pressure data, indicative of a pump health parameter, ECM 50 can determine whether a prognostic pump health alert is justified, and output such an alert 64 as appropriate, as further discussed herein.

INDUSTRIAL APPLICABILITY

Figure 4:
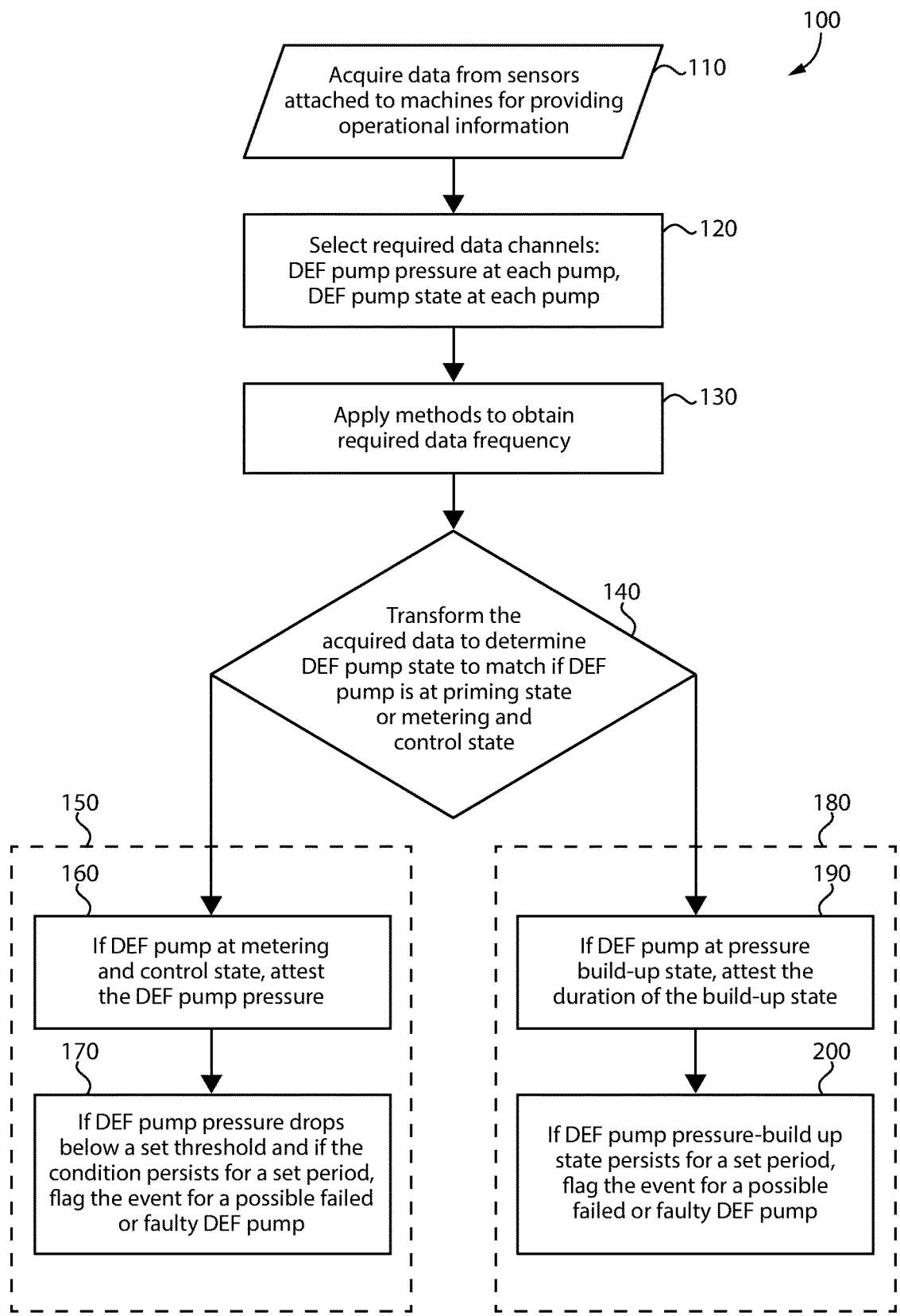
FIG. 4 is a flowchart illustrating example methodology and logic flow, according to one embodiment.

Referring now also to FIG. 4, there is shown a flowchart 100 illustrating example methodology and logic flow according to the present disclosure. At a block 110 data is acquired from sensors attached to parts of machine 10 providing operational information (machine data) as discussed herein. The machine data can include without limitation data associated with states or activities of a machine generally, or systems of a machine such as an engine system or aftertreatment system. Block 110 can include acquiring the fluid pressure data indicative of a pump health parameter as described herein from all of the reductant pumps as well as any other data pertinent to prognostically evaluating pump health. From block 110, flowchart 100 advances to a block 120 to select required data channels including DEF pump pressure (such as pump outlet pressure) at each pump and DEF pump state at each pump. As discussed herein selecting the required data channels may include differentiating between priming versus dosing states. Selecting the required data channels can also include differentiating from a pump purging state that may occur after a pumping/dosing cycle, or differentiating from still other pump operating states or machine states where prognostic pump health diagnosis is inappropriate or inferior.

From block 120, flowchart 100 advances to a block 130 to apply methods to obtained required data frequency. In an implementation, block 130 includes downsampling data that has been acquired such as to obtain one sample of pump outlet pressure per second or some other time interval. From block 130, flow chart 100 advances to a block 140 to transform the acquired data to determine DEF pump state to match if DEF pump is at priming state or metering and control state. At block 140 data appropriate to a present pump operating state can be acquired, for example only for priming or only for dosing. Block 140 can also be understood as triggering different logic paths based upon whether the reductant pump is in a priming state or a metering and control state. Put differently, reductant pump control unit 52 is further structured to execute one of a first logic path or a second logic path based upon the determined one of a first operating state or a second operating state of the reductant pump. From block 140 flowchart 100 can advance to a first logic path 180 or to a second logic path 150. The respective logic paths 180 and 150 can be separate algorithms or part of the same algorithm such as subroutines thereof. Logic path 150 can enable evaluating one or more reductant pumps in relation to one failure or performance degradation mode, and logic path 180 can enable evaluating one or more reductant pumps in relation to another failure or performance degradation mode.

If logic path 180 is executed, at a block 190 reductant pump control unit 52 can determine if DEF pump is at a pressure-build up or pressure building state, e.g. a priming state, and attest the duration of the pressure build-up state. Put differently, at block 190 reductant pump control unit 52 compares a first pump health parameter of observed pressure building time duration to a first prognostic pump failure criterion of expected pressure building time duration. From block 190 logic path 180 can advance to a block 200 to determine if DEF pump pressure build-up state persists for a set period, flag the event for a possible failed or faulty DEF pump. Block 200 may thus include outputting a pump health alert based on a difference between a first pump health parameter and a first prognostic pump failure criterion that is applied.

If logic path 150 is executed, at a block 160 reductant control unit 52 determines if DEF pump at metering in control state, attest the DEF pump pressure. Put differently, at block 160 a second pump health parameter of pump outlet pressure magnitude is compared to a second prognostic pump failure criterion of expected pump outlet pressure magnitude. From block 160 flowchart 100 advances to a block 170 to determine if DEF pump drops below a set threshold and if the condition persists for a set period, flag the event for a possible failed or faulty DEF pump. Block 170 may thus also include outputting a pump health alert based upon a difference between a second pump health parameter and a second prognostic pump failure criterion. In the case of either logic path the pump health parameter and prognostic pump failure criterion applied may be dependent upon the reductant pump operating state that is determined.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. The terms "first" and "second" are used herein only for convenience of description and not intended to require or suggest any particular ordering or arrangement of structures or operations. Further, the phrase "based on" and like phrases is intended to mean "based, at least in part, on" unless explicitly stated otherwise.

What is claimed is:

1. A method of operating an exhaust aftertreatment system for an engine comprising:
   receiving fluid pressure data of a reductant pump in an exhaust aftertreatment system for an engine;
   operating the reductant pump in a first operating state;
   operating the reductant pump in a second operating state;
   determining which one of the first pump operating state or the second pump operating state the reductant pump is presently operating in;
   comparing a pump health parameter indicated by the fluid pressure data to one of a first prognostic pump failure criterion associated with a first failure mode of the reductant pump or a second prognostic pump failure criterion associated with a second failure mode of the reductant pump, based upon the determining which one of the first pump operating state or the second pump operating state the reductant pump is presently operating in; and
   outputting a pump health alert based upon a difference between the pump health parameter and the respective one of the first prognostic pump failure criterion and the second prognostic pump failure criterion.

2. The method of claim 1 wherein the receiving fluid pressure data includes receiving pressure data from a pump outlet pressure sensor.

3. The method of claim 1 wherein the determining one of a first pump operating state or a second pump operating state includes determining one of a pressure building state or a metering and control state of the reductant pump.

4. The method of claim 3 wherein the pressure building state includes a pump priming state.

5. The method of claim 4 wherein the pump health parameter includes an observed pressure building time duration, and the first prognostic pump failure criterion includes an expected pressure building time duration.

6. The method of claim 3 wherein the metering and control state includes a dosing state.

7. The method of claim 6 wherein the pump health parameter includes an observed pump outlet pressure magnitude, and the second prognostic pump failure criterion includes an expected pump outlet pressure magnitude.

8. The method of claim 1 wherein the reductant pump is one of a plurality of reductant pumps in the exhaust aftertreatment system, and further comprising comparing a pump health parameter indicated by fluid pressure data of each of the plurality of reductant pumps to one of the first prognostic pump failure criterion or the second prognostic pump failure criterion, and outputting the pump health alert based upon a difference between any one of the respective pump health parameters and respective first prognostic pump failure criterion or second prognostic pump failure criterion.

9. An exhaust aftertreatment system comprising:
   a reductant pump operable in a first operating state and in a second operating state;
   a fluid pressure sensor;
   a reductant pump control unit structured to:
      receive fluid pressure data of the reductant pump from the fluid pressure sensor;
      determine which one of the first pump operating state or the second pump operating state the reductant pump is presently operating in;
      compare a pump health parameter indicated by the fluid pressure data to one of a first prognostic pump failure criterion associated with a first failure mode of the reductant pump or a second prognostic pump failure criterion associated with a second failure mode of the reductant pump, based upon the determined which one of the first pump operating state or the second pump operating state the reductant pump is presently operating in; and
      output a pump health alert based upon a difference between the pump health parameter and the respective one of the first prognostic pump failure criterion and the second prognostic pump failure criterion.

10. The system of claim 9 wherein the fluid pressure sensor includes a pump outlet pressure sensor.

11. The system of claim 9 wherein the first operating state includes a pressure building state, the pump health parameter includes an observed pressure building time duration, and the first prognostic pump failure criterion includes an expected pressure building time duration.

12. The system of claim 9 wherein the second operating state includes a metering and control state, the pump health parameter includes an observed pump outlet pressure magnitude, and the second prognostic pump failure criterion includes an expected pump outlet pressure magnitude.

13. The system of claim 9 wherein the reductant pump is one of a plurality of reductant pumps, and further comprising a plurality of reductant injectors each fluidly connected to one of the plurality of reductant pumps.

14. The system of claim 9 wherein the reductant pump control unit is further structured to execute one of a first logic path or a second logic path based upon the determined one of a first operating state or a second operating state of the reductant pump.

15. The system of claim 14 wherein the reductant pump control unit is further structured to output the pump health alert based on one pump failure mode where the first logic path is executed, and to output the pump health alert based on another pump failure mode where the second logic path is executed.

16. A control system for an exhaust aftertreatment system in a machine comprising:
   a reductant pump control unit structured to:
      receive fluid pressure data of a reductant pump operable in a first pump operating state and in a second pump operating state, and the fluid pressure data being indicative of a pump health parameter;
      determine which one of the first pump operating state or the second pump operating state the reductant pump is presently operating in;
      compare the pump health parameter to a prognostic pump failure criterion that is dependent upon the determined which one of the first pump operating state or the second pump operating state the reductant pump is presently operating in; and
      output a pump health alert based upon a difference between the pump health parameter and the prognostic pump failure criterion.

17. The control system of claim 16 wherein the reductant pump control unit is further structured to:
   execute a first logic path comparing the pump health parameter to the prognostic pump failure criterion where the reductant pump is in a pressure building operating state; and execute a second logic path comparing a second pump health parameter to a second prognostic pump failure criterion where the reductant pump is in a metering and control operating state.

18. The control system of claim 17 wherein the first pump health parameter is an observed pressure building time duration, and the first prognostic pump failure criterion is an expected pressure building time duration.

19. The control system of claim 17 wherein the second pump health parameter is an observed pump outlet pressure magnitude, and the second prognostic pump failure criterion is an expected pump outlet pressure magnitude.

20. The control system of claim 16 further comprising an alert device structured to operate responsive to the pump health alert.

* * * * *